US008589932B2

(12) United States Patent
Bower, III et al.

(10) Patent No.: US 8,589,932 B2
(45) Date of Patent: Nov. 19, 2013

(54) DATA PROCESSING WORKLOAD CONTROL

(75) Inventors: Fred A. Bower, III, Durham, NC (US);
Deepak W. Elias, Southbury, CT (US);
Nikhil Hegde, Austin, TX (US); Jason M. Heim, Poughkeepsie, NY (US);
Sandhya Kapoor, Austin, TX (US);
Gregory J. McKnight, Durham, NC (US); Peter J. Morjan, Boeblingen (DE); Tony W. Offer, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/829,588

(22) Filed: Jul. 2, 2010

(65) Prior Publication Data
US 2012/0005683 A1 Jan. 5, 2012

(51) Int. Cl.
G06F 9/46 (2006.01)
G06F 9/455 (2006.01)
G06F 1/00 (2006.01)

(52) U.S. Cl.
USPC ............................... 718/102; 718/1; 713/300

(58) Field of Classification Search
USPC ............................................ 718/300, 1, 102
See application file for complete search history.

(56) References Cited

U.S. PATENT DOCUMENTS

| 6,996,647 | B2 | 2/2006 | Raghavan et al. | |
|---|---|---|---|---|
| 7,058,826 | B2 | 6/2006 | Fung | |
| 7,086,058 | B2 | 8/2006 | Luick | |
| 7,181,578 | B1 | 2/2007 | Guha et al. | |
| 7,447,920 | B2 | 11/2008 | Sharma et al. | |
| 7,480,912 | B2 | 1/2009 | Arnold et al. | |
| 7,861,102 | B1* | 12/2010 | Ranganathan et al. | 713/300 |
| 7,958,508 | B2* | 6/2011 | Shimizu et al. | 718/102 |
| 2005/0155022 | A1 | 7/2005 | DeWitt, Jr. et al. | |
| 2006/0161678 | A1 | 7/2006 | Bopardikar et al. | |
| 2008/0250415 | A1 | 10/2008 | Illikkal et al. | |
| 2009/0187782 | A1* | 7/2009 | Greene et al. | 713/340 |
| 2009/0235263 | A1* | 9/2009 | Furukawa | 718/102 |
| 2009/0265568 | A1* | 10/2009 | Jackson | 713/320 |
| 2011/0213997 | A1* | 9/2011 | Kansal et al. | 713/324 |

OTHER PUBLICATIONS

U.S. Appl. No. 12/511,516, filed Jul. 29, 2009, Bower, et al.
Varsamopoulos et al., "Thermal-Aware Task Placement in Data Centers", Arizona State University Impact Lab Slide Presentation, Jun. 2010, pp. 1-30, slideshare.net (online), [accessed Oct. 15, 2012], URL: http://www.slideshare.net/datacenters/thermalaware-task-placement-in-data-centers.

* cited by examiner

*Primary Examiner* — Charles E Anya
(74) *Attorney, Agent, or Firm* — Edward J. Lenart; Thomas E. Tyson; Biggers & Ohanian, LLP

(57) ABSTRACT

Data processing workload control in a data center is provided, where the data center includes computers whose operations consume power and a workload controller composed of automated computing machinery that controls the overall data processing workload in the data center. The data processing workload is composed of a plurality of specific data processing jobs, including scheduling, by the workload controller in dependence upon power performance information, the data processing jobs for execution upon the computers in the data center, the power performance information including power consumption at a plurality of power-conserving states for each computer in the data center that executes data processing jobs and dispatching by the workload controller the data processing jobs as scheduled for execution on computers in the data center.

20 Claims, 6 Drawing Sheets

DATA PROCESSING WORKLOAD CONTROL

BACKGROUND OF THE INVENTION

1. Field of the Invention

The field of the invention is data processing, or, more specifically, methods, apparatus, and products for data processing workload control.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Data processing workload control is an area of technology that has seen considerable advancement. State of the art batch job scheduling systems are tailored toward optimizing throughput of a cluster of system resources and/or minimizing individual job latency. In systems where a task migration is supported, a scheduler may collect runtime statistics to make a determination on whether moving a job is possible and profitable toward the optimization goal. In today's job scheduling systems, power efficiency is not generally considered in the initial scheduling of the job nor in the subsequent migration that may occur in response to an event that triggers a scheduling policy.

SUMMARY OF THE INVENTION

Methods, apparatus, and computer program products are disclosed for data processing workload control in a data center, where the data center includes computers whose operations consume power and a workload controller composed of automated computing machinery that controls the overall data processing workload in the data center and the data processing workload is composed of a plurality of specific data processing jobs, including scheduling, by the workload controller in dependence upon power performance information, the data processing jobs for execution upon the computers in the data center, the power performance information including power consumption at a plurality of power-conserving operational states for each computer in the data center that executes data processing jobs and dispatching by the workload controller the data processing jobs as scheduled for execution on computers in the data center.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
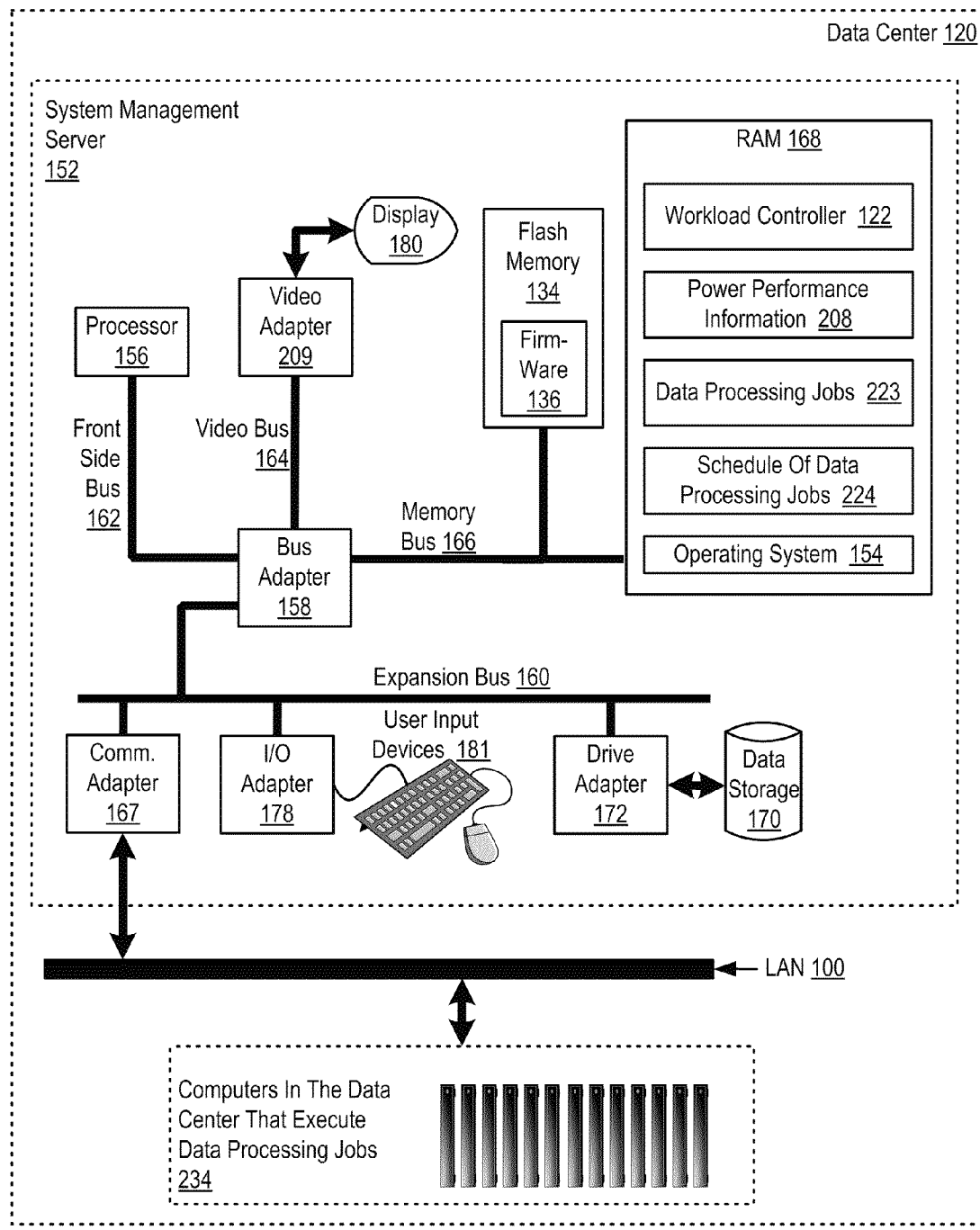
FIG. 1 sets forth a functional block diagram of an example of automated computing machinery, an example of automated apparatus, that implements data processing workload control according to embodiments of the present invention.

Example methods, apparatus, and products for data processing workload control according to embodiments of the present invention are described with reference to the accompanying drawings, beginning with FIG. 1. Data processing workload control according to embodiments of the present invention is generally implemented with computers, that is, with automated computing machinery. FIG. 1 sets forth a functional block diagram of an example of automated computing machinery, an example of automated apparatus, that implements data processing workload control according to embodiments of the present invention.

The apparatus of FIG. 1 is disposed in a data center (120). The data center (120) is a facility used to house mission critical computer systems and associated components. The data center (120) serves as a centralized repository for the storage, management, and dissemination of data and information organized around a particular subject or pertaining to a particular business. A data center may exist within an organization's facilities or may be maintained as a specialized facility. Data centers vary in size from buildings filled with servers to a single server room or even to small computer closets.

The apparatus disposed within the data center includes computers (234) that execute data processing jobs, whose operations consume power, and a system management server (152) that includes a workload controller (122), automated computing machinery that controls the overall data processing workload in the data center. The data processing workload is composed of a number of specific data processing jobs (223). A data processing job (223), as the term is used here, is a defined data processing task, which, in order to execute, requires certain computer resources, such as CPU time, computer memory, input/output support, and so on. There are many kinds of data processing jobs, examples of which would include responding to requests for web pages, storing and forwarding email messages, accounting tasks such as ledger postings, database updates, and so on. Each data processing job, as it executes on a computer in the data center, also requires some quantity of power. In this specification, the amount of power that a particular job requires to execute is treated as a computing resource, in a manner similar to the treatment of CPU time, memory, and the like.

The system management server (152), like all the computers in the data center, includes at least one computer processor (156) or 'CPU' as well as random access memory (168) (RAM') which is connected through a high speed memory bus (166) and bus adapter (158) to processor (156) and to other components of the system management server (152).

The system management server (152) is a server in the data center (120) that automates many of the processes that are required to proactively manage computers (234) in the data center (120), including capacity planning, asset tracking, preventive maintenance, diagnostic monitoring, troubleshooting, firmware updates, and so on.

Stored in RAM (168) in the system management server is a workload controller (122) that schedules and dispatches data processing jobs (223) among the computers (234) in the data center (120). The workload controller (122) in the example of FIG. 1 schedules data processing jobs (223) by use of power performance information (208) that includes power consumption information at a number of power-conserving operational states for each computer in the data center that executes data processing jobs. The workload controller also dispatches the data processing jobs as scheduled (224) for execution on computers in the data center. The workload controller may be implemented, for example, as a complex programmable logic device ('CPLD'), a field programmable gate array ('FPGA'), an application specific integrated circuit ('ASIC'), or, as shown here, as computer program instructions disposed in computer memory (168) coupled to a computer processor.

Also stored in RAM (168) in the example of FIG. 1 is an operating system (154). Operating systems useful for data processing workload control according to embodiments of the present invention include UNIX™, Linux™, Microsoft XP™, AIX™, IBM's i5/OS™, and others as will occur to those of skill in the art. The operating system (154), the workload controller (122), the power performance information (208), definitions of data processing jobs (223), and a schedule of data processing jobs (224) in the example of FIG. 1 are shown in RAM (168), but many components of such software typically are stored in non-volatile memory also, such as, for example, on a disk drive (170) or in flash memory (134).

The system management server (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in computers that implement data processing workload control according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example system management server (152) of FIG. 1 includes a communications adapter (167) for data communications with other computers and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing workload control according to embodiments of the present invention include modems for wired dial-up communications, Ethernet (IEEE 802.3) adapters for wired data communications network communications, and 802.11 adapters for wireless data communications network communications.

The arrangement of servers, computers, and other devices making up the example apparatus of FIG. 1 are for explanation, not for limitation. Data processing systems useful for data processing workload control according to various embodiments of the present invention may include additional servers, routers, other devices, and peer-to-peer architectures, not shown in FIG. 1, as will occur to those of skill in the art. In the particular example of FIG. 1, the computers (234) that execute data processing jobs in the data center are coupled for data communications to the system management server (152) through local area network (100). Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
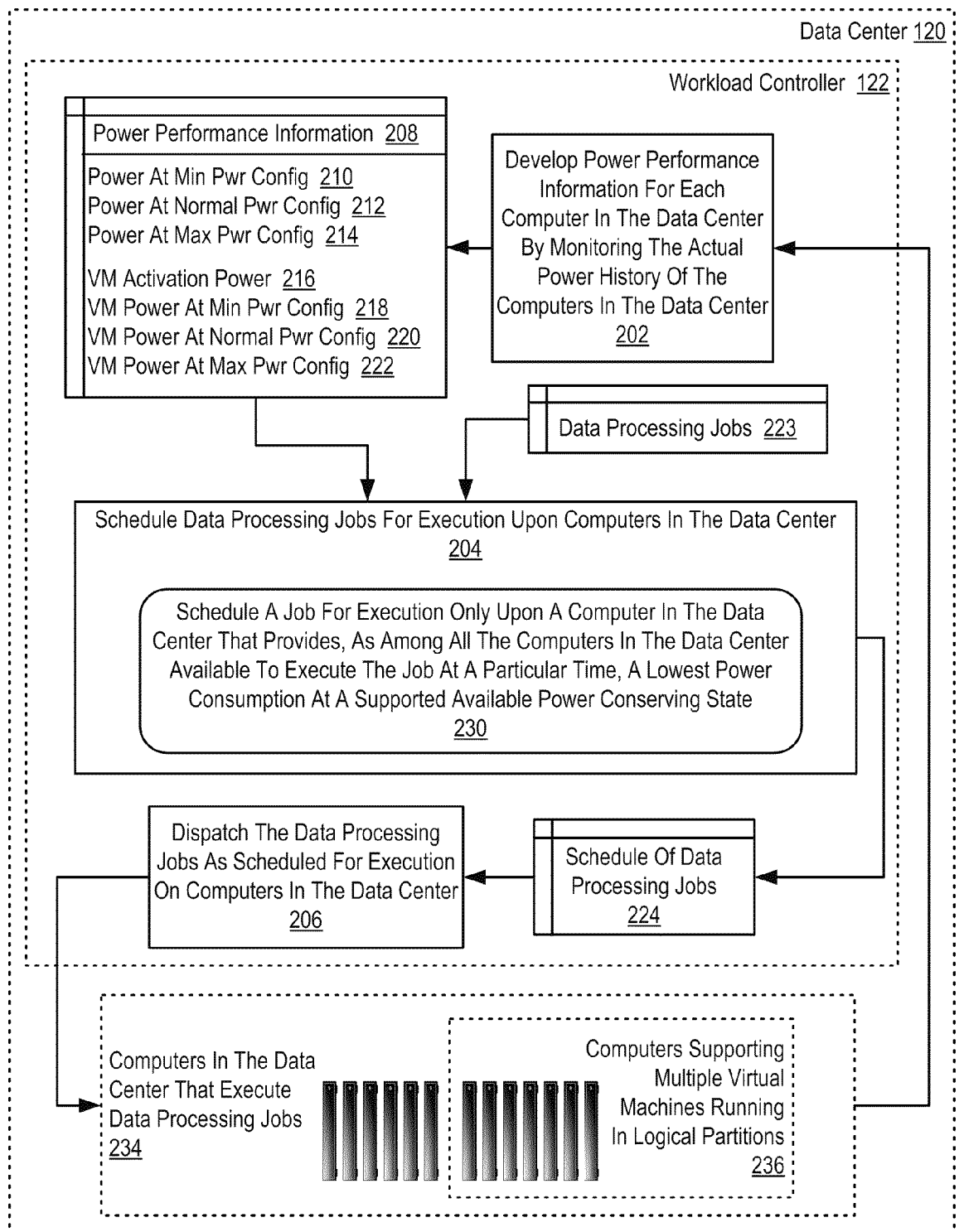
FIG. 2 sets forth a flow chart illustrating an example method of data processing workload control according to embodiments of the present invention.

For further explanation, FIG. 2 sets forth a flow chart illustrating an example method of data processing workload control according to embodiments of the present invention. The method of FIG. 2 is implemented with apparatus like the apparatus described above with reference to FIG. 1—with computers (234) in a data center (120) where a workload controller (122) controls the overall data processing workload in the data center in the form of a number of data processing jobs (223)—so that the method of FIG. 2 is explained here with reference both to FIG. 2 and also to FIG. 1.

The method of FIG. 2 includes scheduling (204), by the workload controller (122) in dependence upon power performance information (208), the data processing jobs (223) for execution upon the computers (234) in the data center (120). The data processing jobs (223) themselves may be specified by a job identifier, a job description, required data processing resources, CPU requirements memory requirements, I/O requirements, and, possibly, power consumption targets. The power performance information (208) includes power consumption at a number of power conservation states for each computer in the data center that executes data processing jobs. In this example, the power consumption at a number of power conservation states is represented as computer power consumption at a minimum power conservation state (210), a normal power conservation state (212), and a maximum performance state (214) for each computer in the data center that executes data processing jobs. Power information is further explained with reference to Table 1.

TABLE 1

Unloaded System Power Information for Supported System Power States

| Computer ID | Minimum | Normal | Maximum |
|---|---|---|---|
| 001 | 100000 | 120000 | 270000 |
| 002 | 130000 | 225000 | 350000 |
| 003 | 115000 | 180000 | 300000 |
| 004 | 130000 | 225000 | 350000 |
| 005 | 100000 | 120000 | 270000 |
| 006 | 100000 | 120000 | 270000 |

Each record in Table 1 represents power information for one of the computers in the data center. Each record of Table 1 includes the identifier (in the 'Computer ID' column) of the computer whose power information is represented by the record, as well as power consumption at a number of operational power conservation states for each computer whose power consumption information is represented in Table 1, including computer power consumption at a lowest-performance, lowest-power state (in the 'Minimum' column), a normal power state (in the 'Normal' column), and a maximum-performance, maximum-power power state (in the 'Maximum' column), all expressed here in milliwatts. For ease of explanation, only six computers are represented in Table 1, but power performance information for any number of computers can be represented in various embodiments of the present invention. Further, only three power states are shown per computer, but individual systems may support greater or fewer power states. In interpreting the data in Table 1, it should be evident to one skilled in the art that rarely will a single value represent the dynamic power consumption that will be observed when a workload is applied to a system. The values shown in Table 1 are intended to be the idle system power consumption in a power-on, workload-idle system state at each of the available power states of the system.

TABLE 2

Schedule Of Data Processing Jobs

| Data Processing Job ID | Target Computer ID | Execution Start Time |
|---|---|---|
| 001 | 001 | 01:37:46 |
| 002 | 001 | 01:37:47 |
| 003 | 002 | 01:38:01 |
| 004 | 003 | 01:38:30 |
| 005 | 004 | 01:38:45 |

In this example, the output of the scheduling process (204) is a schedule of data processing jobs (224), explained further with reference to Table 2. Each record in Table 2 represents a schedule for five data processing jobs, assigned to a group of computers in the data center for execution. Each record in Table 2 includes the identifier of a data processing job (in the 'Data Processing Job ID' column), the identifier of the computer in the data center upon which the job has been dispatched for execution (in the 'Target Computer ID' column), and the execution start time for each job.

Some embodiments schedule data processing jobs in dependence upon power performance information so that power consumption is optimized across the data center, that is, across computers in the data center that execute data processing jobs. In the method of FIG. 2, scheduling (204) includes scheduling (230) a job for execution only upon a computer in the data center that provides, as among all the computers in the data center available to execute the job at a particular time, a lowest power consumption at a selectable power state that is known to satisfy the performance requirements of the job. In this context, power state selectability will be governed by the characteristics of the workload and the characteristics of the other jobs already running on the system. In some circumstances, the already-running jobs will demand a particular minimum power state of the system in order to meet their processing demands. This jobset-minimum power state may be greater than the power state required by the newly-scheduled job, but the system may not support reconfiguration on a per-job granularity, thus requiring the newly-scheduled job to assume the power state of the pre-existing jobs. Such a scheduling policy, when implemented with the power performance information in Table 1, can result in a schedule similar to that illustrated in Table 3.

TABLE 3

Schedule Of Data Processing Jobs

| Data Processing Job ID | Target Computer ID | Execution Start Time |
|---|---|---|
| 001 | 006 | 01:37:46 |
| 002 | 002 | 01:37:47 |
| 003 | 003 | 01:38:01 |
| 004 | 006 | 01:38:30 |
| 005 | 002 | 01:38:45 |

The schedule records in Table 3 for jobs 001, 002, and 003 designate those jobs for dispatch respectively to target computers 006, 002, and 003, the three computers having the lowest power consumption among the computers for which power consumption information is provided in Table 1. In this example, the workload scheduler determines that job 001 is not fully utilizing the resources of computer 006 and so schedules job 004 for execution on computer 006, as it has the best power profile that simultaneously meets the performance needs of the job. Similarly, the workload scheduler uses computer 002 again for job 005. In this power optimizing process, so long as the overall workload permits and capacity on lower power computers becomes available in a timely fashion, the workload scheduler may rarely use the computers having higher power consumption, computers 002 and 005.

The method of FIG. 2 also includes dispatching (206) by the workload controller (122) the data processing jobs (224) as scheduled for execution on computers in the data center. Taking either Table 2 or Table 3 as an example of a schedule of data processing jobs (224), dispatching (206) the data processing jobs (223) as scheduled can be carried out by dispatching the scheduled data processing jobs upon their arrival at the scheduler. In some cases, both the executables for a data processing job as well as the data or location of the data may already be configured on the computer on which a data processing job is dispatched, so that the dispatching process merely requires the workload controller to advise the target computer to start the data processing job. In other cases, dispatching can include providing to the target computer not only the instruction to start a data processing job, but also the data or the system reconfiguration commands to access the location of the data to be processed as well as executable computer program instructions for the data processing job.

TABLE 4

Job Scheduling Power History

| Schedule ID | Job ID | Computer ID | Power State | Average Power | Co-Located Job ID(s) |
|---|---|---|---|---|---|
| 001 | 001 | 006 | Normal | 148500 | NULL |
| 002 | 002 | 002 | Minimum | 153000 | NULL |
| 003 | 003 | 003 | Maximum | 320000 | NULL |
| 004 | 004 | 006 | Normal | 168300 | 001 |
| 005 | 005 | 002 | Minimum | 190000 | 002 |

The method of FIG. 2 also includes developing (202) the power performance information (208) for each computer (234) in the data center (120) by monitoring the actual power history of the computers in the data center. Upon initial installation of such data processing workload control, the actual power history may not be available; it may need in effect to be 'learned' over time. Upon initial installation, therefore, the power history information (208) may be seeded with the advertised power consumption bounds for the hardware involved and later adjusted to reflect actual runtime measured values.

Table 4 shows a sample embodiment of the collection of this power history information for the sample schedule of jobs provided in Table 3 on the sample computers from Table 1. The 'Schedule ID' column provides a chronological ordering of the job scheduling task. When new workload is added to a machine with an existing workload running, the 'Co-Located Job ID(s)' column is populated with the other jobs already resident. This enables analysis of the interaction effects that various combinations of jobs may exhibit on specific hardware. For example, job 004 is scheduled on target machine 006, which already is running job 001 in a normal power-conservation configuration. With no prior history of job-specific power consumption for job 004's class on machine 006's class, a scheduling algorithm might infer that job 004 will consume between 139800 and 149450 mW when scheduled in isolation on a machine identical in configuration to machine 006, configured for operation in a normal power-conservation state. The estimate is arrived at by taking the difference of the base power consumption information for the system configuration from Table 1 and the actual measured data in Table 4, factoring out the effects of the already-resident workload from job 1. The range is arrived at by isolating the workload-specific contributions to the power consumption of the system (that is, taking the difference between the measured power before installing the new workload and after installing the new workload, using data in Table 1 and Table 4, as needed). In configurations where multiple workloads are running simultaneously on a given machine, this result forms one end of the bounds. The other end is arrived at by averaging all running workloads power after subtracting the base system activation power from Table 1. In the above example, the equation is (168300−120000)/2. These workload and system configuration-specific power estimates can then be used in later implementation of scheduling policies, including the introduction of a power budget, which can be associated with a job or group of jobs.

In the example of FIG. 2, at least some of the computers (236) in the data center support multiple virtual machines running in logical partitions. The power performance information (208) for the computers that support multiple virtual machines running in logical partitions also include a power requirement (216) for activation of a virtual machine in a logical partition and power consumption values for incremental minimum (218), normal (220), and maximum (222) system power states for each virtual machine that can be activated on any computer in the data center.

The invention operates by keeping power measurements for workloads running in a virtualized environment, correlated with the systems they run on, in a historical database, an example of which is shown in Table 4, above. When a new instance of a workload with a power consumption history is scheduled, the VM placement algorithm is modified to look up the historical information and utilize it in the placement of the new work. The policy behind the decision process may be varied, but the most likely uses are in an effort to minimize total power consumption of the entire work pool and minimizing power consumption while still maintaining service-level agreements. The advantage of taking power into account when scheduling new work is that heterogeneous virtual machine hosts and how workloads exploit (or fail to exploit) their different capabilities and power characteristics can be discovered by the scheduler dynamically. The use of real historical data is preferred to static pre-defined values, which will not be as accurate and may cause the scheduling decision to miss optimization opportunities. Finally, with a power-aware scheduling policy in place, historical data about where jobs were scheduled will reveal to a data center administrator which hardware is best suited (provides best power-performance economy) to which workloads, allowing for better planning of new hardware acquisition.

The workload manager can collect power consumption data for virtual machines as they are placed in a hardware compute pool of resources. The collection of this data can be, for example, based upon average measurements of power consumption. At the time of hardware deployment, the workload manager can take an initial measurement at a system idle state when no jobs have been scheduled on it and store that information in a power performance information database similar to the one shown in Table 1. Thereafter, when new work is scheduled, power measurements are sampled from the system periodically and stored in the database. The sampled measurements have the base system power recorded initially subtracted to arrive at a power measurement for the workload itself. The data collection and storage policy can be varied, but in at least some embodiments, samples are averaged with sampling on a periodic interval that is sized based upon the fidelity of power measurement that the underlying hardware supports. For example, if the system is instrumented with a power supply that maintains a 30-second rolling average of power consumption, measurements may be taken once every 30 seconds with the first 30 seconds of scheduled runtime ignored or weighted. Once power data has been created for a given workload on a given system, the workload manager may then use that data in making scheduling decisions for future instances of that workload. In systems where workloads or jobs of a workload are long-lived once scheduled, data sampling may be placed on a longer interval if it is observed that power data has reached steady-state. The power/workload information can be maintained job-by-job or for workloads including groups of jobs. When the power/workload data is accessed for purposes of scheduling, the power performance information database can be queried to determine:

1. Whether average power data for a particular workload or job running on any computer in the data center exists.
2. How many computers in the data center this workload or job has power data from (that is, how many computers have had this workload or job scheduled on them at some time in the history of data collection).

3. Whether any candidate locations for scheduling have power data available (that is, what is the intersection of available systems and power data for this workload or job).

Once the above are determined, the workload manager can make a placement decision, upon which computer or computers to schedule a job or jobs in a workload. Periodically, the power performance database will be accessed to determine whether running jobs have a better optimized placement possible given changes in hardware availability and job composition in an active work queue or current schedule of data processing jobs.

Another use of this power performance data is an offline analysis task. In this process, the power/workload data is analyzed to group like systems and identify anomalies in power/performance in the compute substrate. For this process, the power/workload data is used to infer characteristics. For example, if workload 1 and workload 2 are observed to have similar power consumption characteristics on a set of machines, an inference can be made that power consumption data for workload 1 on machines that it has never run on will match the power consumption data for workload 2 on those machines. Large families of analyses are possible with this sort of inference or searching for disparities (situations where the inferred behavior is discovered to not be the case).

Figure 3:
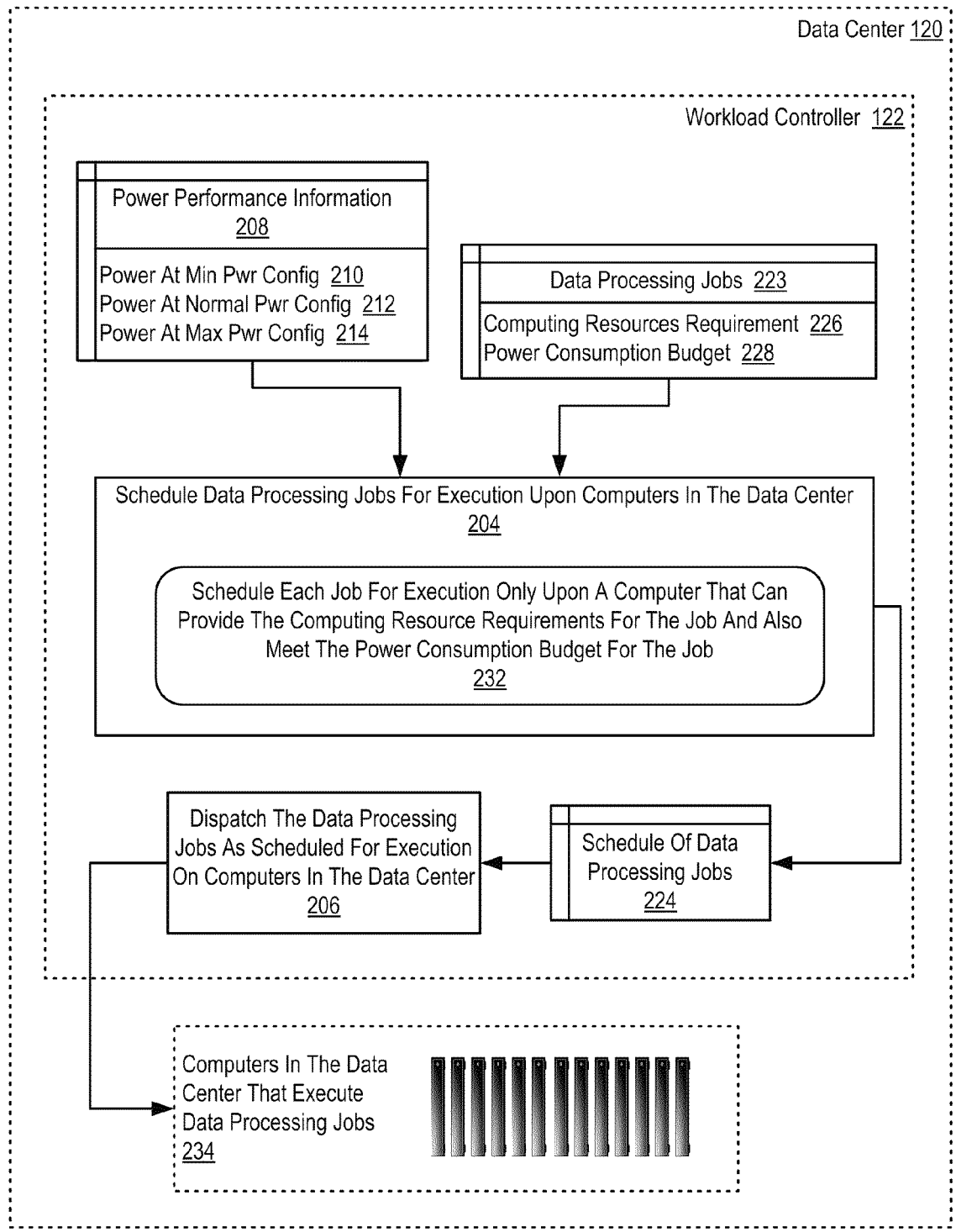
FIG. 3 sets forth a flow chart illustrating a further example method of data processing workload control according to embodiments of the present invention.

For further explanation, FIG. 3 sets forth a flow chart illustrating a further example method of data processing workload control according to embodiments of the present invention. The method of FIG. 3 is similar to the method of FIG. 2, including as it does scheduling (204) data processing jobs (223) in dependence upon power performance information (208) and dispatching (206) the data processing jobs (223) as scheduled for execution on computers in the data center. Also like the method of FIG. 2, the method of FIG. 3 is implemented with apparatus like the apparatus described above with reference to FIG. 1—with computers (234) in a data center (120) where a workload controller (122) controls the overall data processing workload in the data center in the form of a number of data processing jobs (223)—so that the method of FIG. 3 also is explained here with reference both to FIG. 3 and also to FIG. 1.

In the method of FIG. 3, however, each data processing job (223) is characterized by a computing resources requirement (226) and a power consumption budget (228), and the scheduling process (204) includes scheduling (232) each job for execution only upon a computer that can provide the computing resource requirements (226) for the job and also meet the power consumption budget (228) for the job. Data processing jobs characterized by computing resource requirements and power consumption budgets are explained further with reference to Table 5.

TABLE 5

Data Processing Jobs

| Job ID | Description | CPU (cores@frequency (GHz)) | Memory (GB) | Power Budget (mW) |
|---|---|---|---|---|
| 001 | Web Server 1 | 2@2.66 | 4 | 120000 |
| 002 | Numeric Analysis | 16@2.83 | 64 | 500000 |
| 003 | Database | 8@2.00 | 32 | 350000 |
| 004 | Data Mining | 4@2.50 | 12 | 225000 |
| 005 | Web Server 2 | 8@2.66 | 8 | 200000 |
| 006 | Backup | 2@2.00 | 4 | 300000 |
| 007 | Payroll Processing | 16@2.50 | 6 | 500000 |

Each record in Table 5 is a specification or definition of a data processing job. Each record in Table 5 specifies for a data processing job a data processing job identifier ('Job ID'), a description of the job in data processing terms ('Description'), the number of CPU cores and their minimum frequency required for each job, the amount of memory to be dedicated for use by each job, and a power budget for each job. The data processing jobs represented in Table 5 include:

Web Server 1 and 2: a hyper-text transport protocol (http) service,

Numeric Analysis: a data processing job that executes a scientific algorithm,

Database: a data storage and retrieval server system,

Data Mining: an offline database analysis routine that searches for patterns in database data, Backup: a program to store data to an alternate storage device for purposes of archiving or safe storage, and Payroll Processing: an application to process payroll information and initiate check printing or electronic funds transfer.

Figure 4:
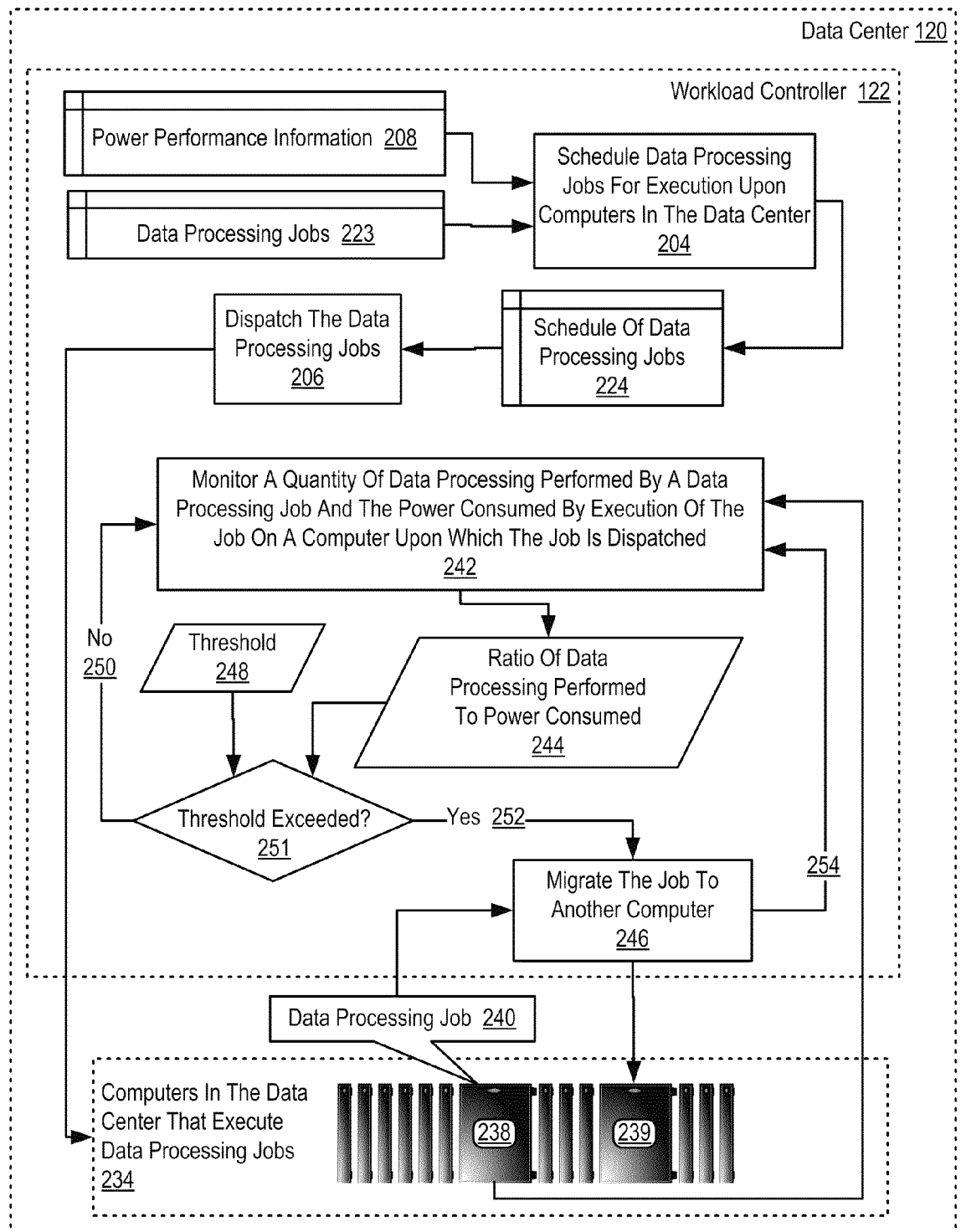
FIG. 4 sets forth a flow chart illustrating a further example method of data processing workload control according to embodiments of the present invention.

For further explanation, FIG. 4 sets forth a flow chart illustrating a further example method of data processing workload control according to embodiments of the present invention. The method of FIG. 4 is similar to the method of FIG. 2, including as it does scheduling (204) data processing jobs (223) in dependence upon power performance information (208) and dispatching (206) the data processing jobs (224) as scheduled for execution on computers in the data center. Also like the method of FIG. 2, the method of FIG. 4 is implemented with apparatus like the apparatus described above with reference to FIG. 1—with computers (234) in a data center (120) where a workload controller (122) controls the overall data processing workload in the data center in the form of a number of data processing jobs (223)—so that the method of FIG. 4 also is explained here with reference both to FIG. 4 and also to FIG. 1.

The problem of finding an optimal placement of a set of jobs with varying requirements on a heterogeneous set of compute resources is known to be of the algorithmic class of NP-Complete problems and is therefore not solvable in polynomial time with the size of the set of jobs, thus making it impractical to implement an optimal job placement policy for commercial use without some additional limitations on the scope of the solution. The following heuristics are therefore provided as a means of simplifying the process of managing workload dynamically for near-optimal energy efficiency.

The method of FIG. 4 also includes monitoring (242) a quantity of data processing performed by a data processing job (240) and the power consumed by execution of the job on a computer (238) upon which the job is dispatched. In the particular example of FIG. 4, the quantity of data processing performed and the power consumed is represented as a ratio (244) of data processing performed to power consumed.

The method of FIG. 4 also includes migrating (248) the data processing job (240) from the computer (238) on which it is currently dispatched to another computer (239) in the data center to continue execution of the data processing job (240) if the ratio (244) of data processing performed to the power consumed falls below a predetermined ratio threshold (248). In this example, the workload controller (122) compares (251) the ratio (244) of data processing performed to the power consumed and the predetermined ratio threshold (248). If the ratio (244) of data processing performed to the power consumed has not fallen (250) below the predetermined ratio threshold (248), the workload controller continues monitoring (242). If the ratio (244) of data processing performed to the power consumed has fallen (252) below the predetermined ratio threshold (248), then the workload controller (122) migrates (246) the job (240) to another computer (239) before returning to monitoring (242).

Figure 4A:
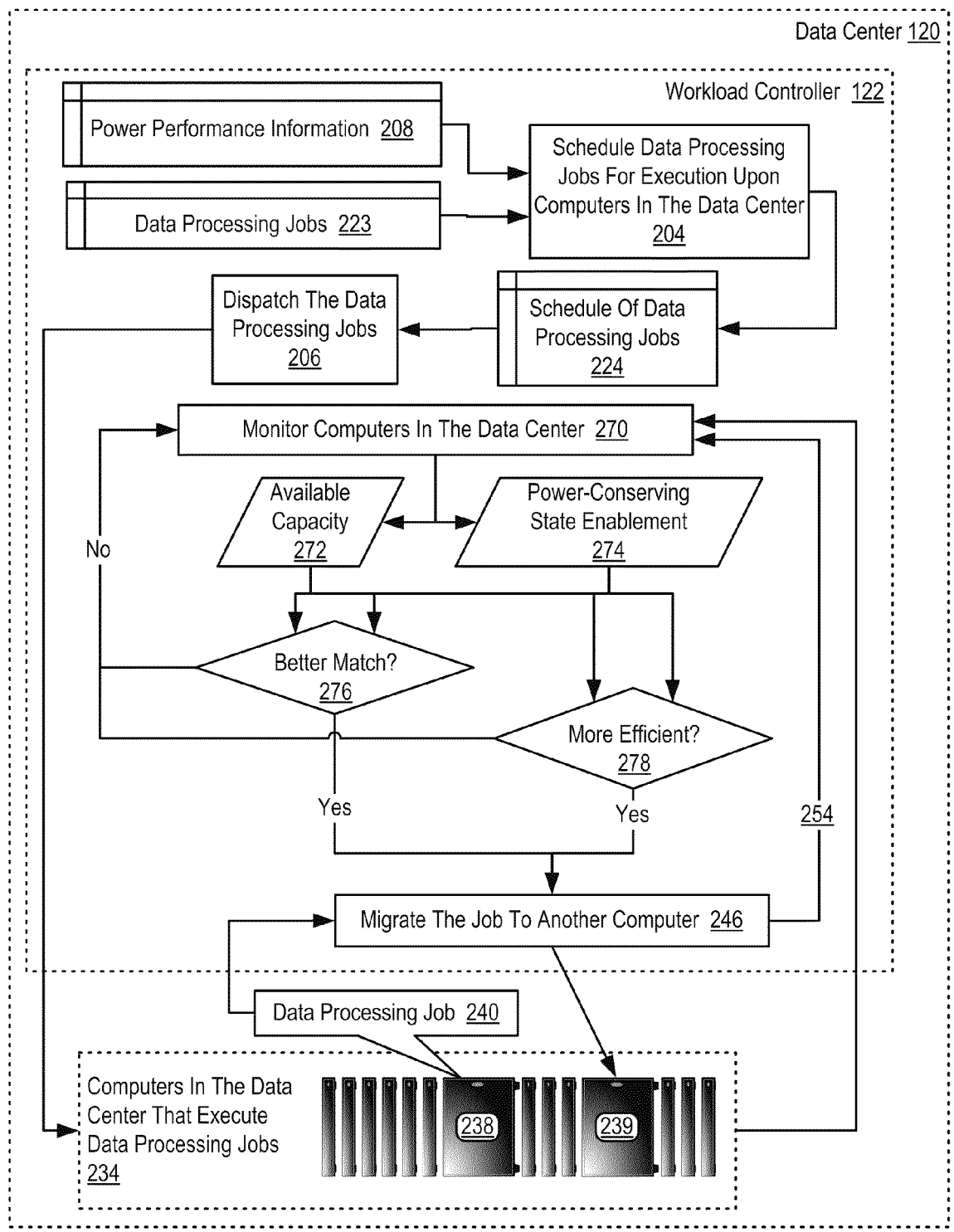
FIG. 4A sets forth a flow chart illustrating a further example method of data processing workload control according to embodiments of the present invention.

Illustrating alternative trigger criteria to the ratio (244), the method of FIG. 4A also includes monitoring (270) available capacity (272) and power-conserving state enablement (274) of the computers in the data center and migrating (246) the data processing job (240) from the computer (238) on which it is currently dispatched to another computer (239) in the data center to continue execution of the data processing job (240) if the target computer provides a better match (276) to the needs of the job than the computer that the job is presently running on. The job may have been previously scheduled on a computer (238) that is operating at a power-conservation state that is greater than the minimum required to meet the needs of the job (240). For example, a collocated data processing job on computer (238) may require a maximum power state and the subject job (240) only requires normal power state on computer (238) to perform to specification. In the original scheduling cycle, job (240) was scheduled on computer (238) because no other resources were available. At a later time, other data processing jobs are completed, thus freeing capacity on computer (239) which is capable of running job (240) at an overall lower power state, resulting in a more efficient schedule for the active set of data processing jobs in the data center.

Alternatively, job (240) in the method of FIG. 4A may be migrated (248) from the computer (238) on which it is currently dispatched to another computer (239) in the data center to continue execution if the result of the migration (248) is that the computer (238) may be placed into a more efficient (278) power conservation state after the migration (248) completes. The overall operation of this algorithm is analogous to the problem of defragmentation of files on a disk media and those skilled in the art will see the direct applicability of defragmentation algorithms to the present problem of scheduling multiple jobs on multiple computers for greatest energy efficiency at the data center level.

Figure 5:
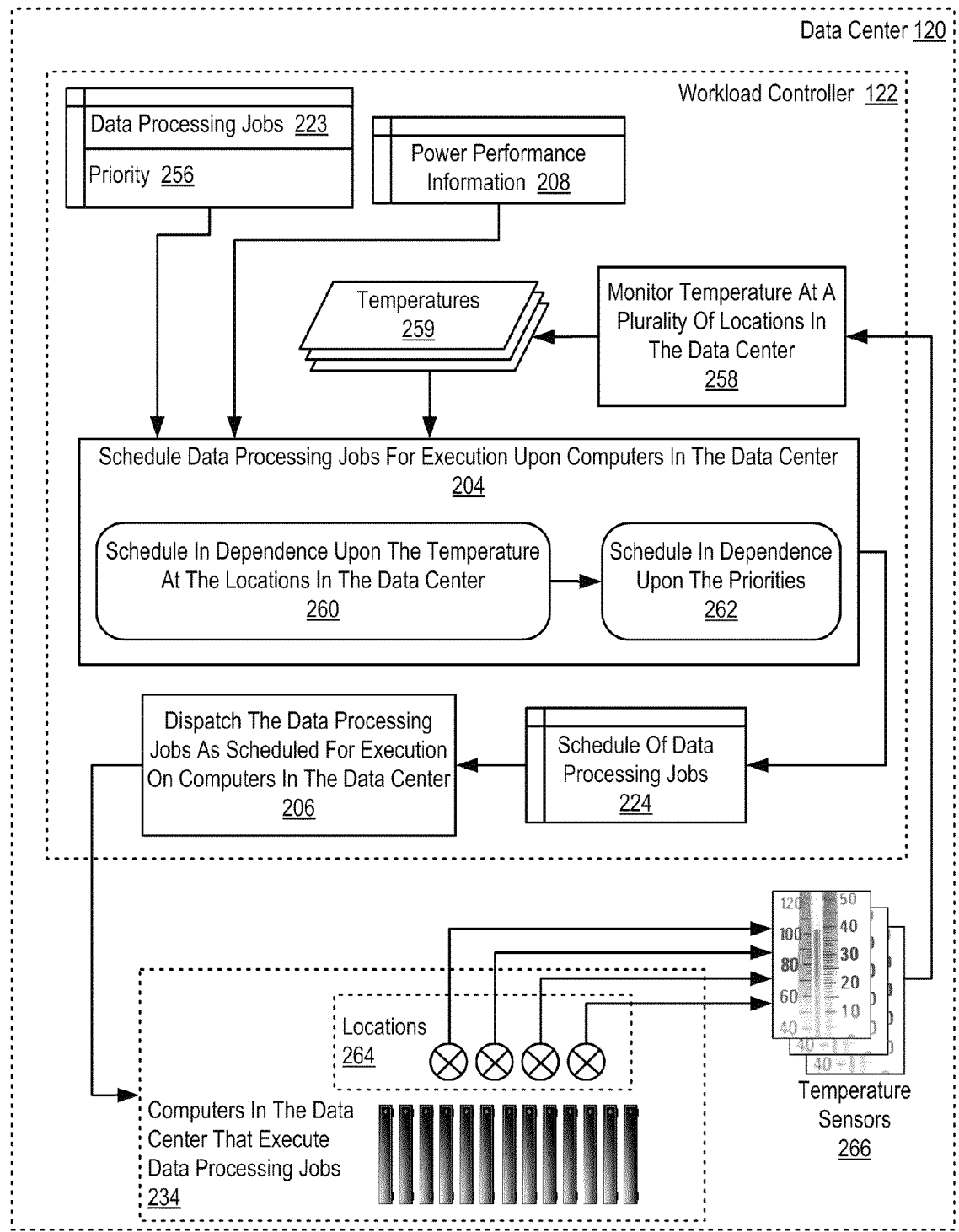
FIG. 5 sets forth a flow chart illustrating a further example method of data processing workload control according to embodiments of the present invention.

For further explanation, FIG. 5 sets forth a flow chart illustrating a further example method of data processing workload control according to embodiments of the present invention. The method of FIG. 5 is similar to the method of FIG. 2, including as it does scheduling (204) data processing jobs (223) in dependence upon power performance information (208) and dispatching (206) the data processing jobs (223) as scheduled for execution on computers in the data center. Also like the method of FIG. 2, the method of FIG. 5 is implemented with apparatus like the apparatus described above with reference to FIG. 1—with computers (234) in a data center (120) where a workload controller (122) controls the overall data processing workload in the data center in the form of a number of data processing jobs (223)—so that the method of FIG. 5 also is explained here with reference both to FIG. 5 and also to FIG. 1.

The method of FIG. 5 also includes monitoring (258) temperature (259) at a plurality of locations (264) in the data center (120), and the scheduling process (204) includes scheduling (260) in dependence upon the temperature (259) at the locations (264) in the data center. With a fairly uniform cooling system in the data center, "hot spots" in the data center are a direct result of increased processing activity in a group of collocated computers executing data processing jobs. The data center typically contains different kinds of computers running different kinds of data processing jobs. Typically a set of computers that have a heavy workload tend to generate much more heat than other computers with lower load, thus causing the surrounding temperature to increase or create a "hot spot". Irregularities in data center geometry or cooling airflow can also lead to the creation of "hot spots". The locations (264) in the data center (120) where temperature is monitored, therefore, are typically expected to be at, on, or near the computers executing data processing jobs. With this arrangement, high priority workloads currently running in hot spots within the data center are preferentially relocated to cooler locales to prevent performance loss from system throttling, which may occur if hot spot operation continues to a point where the system is put into a thermal over-specification condition. Most existing schemes involve identifying the hottest areas of a data-center and simply moving workloads from those areas to cooler areas. However, these schemes do not take into account that the migrated workload will simply heat up a different area of the data-center. In this sense, scheduling (260) in dependence upon the temperature (259) at the locations (264) in the data center can be carried out by:

Identifying, by the monitoring (258) of temperature, hot spots and cool spots using appropriately located temperature sensors and matching workloads, job scheduling, with those areas.

Associate relative priorities among jobs based on predefined criteria.

Attempt to "split" the workloads in hot spots, i.e., if the workload composed of several jobs is being executed on multiple computers, then identify a multiple of a subset of computers whose jobs or workloads can be relocated.

Relocate the workloads such that, relatively speaking, the most important workload in the hottest area of the data center moves to an area surrounded by the coolest area of the data center running the lowest priority job or workload.

If high-priority jobs or workloads are tied to a specific computer or computers in a hot spot, migration or throttling of adjacent low and medium priority workload may be used as an alternative to reduce the heat generation in the hot spot to prevent a need for throttling of the high-priority workload.

Also in the method of FIG. 5, at least some of the data processing jobs (223) are characterized by priorities (256), and the scheduling process (204) includes scheduling (262) in dependence upon the priorities (256). Each computer in the data center can be viewed as inheriting the priority of the job or jobs running on it when throttling or migration decisions are triggered, allowing data center managers to implement policies for migration and throttling that allow for consideration of workload priority in addition to local environmental conditions. An administrator of a data center can assign priority ratings to jobs that execute in the data center. For simplicity of explanation, consider a three-priority system with high, medium, and low priority assignment categories available. Upon receipt of an environmental alert of an over-temperature condition within the data center, the workload management software gathers information about which job or jobs are running on computers in the affected over-temperature zone. In environments where job migration is not available, the workload controller attempts to correct the over-temperature condition by throttling systems running low-priority jobs first, medium-priority jobs second, and high-priority jobs last. In environments where job migration is possible, the workload controller has more options available. If an over-temperature computer is running a high-priority job, that job may be migrated to a cooler location where a lower-priority job set is running. The lower-priority jobs are then migrated to the over-temperature computer and throttling is effected. Other policy implementations are possible. The net effect is that higher priority jobs are always placed on the most-capable hardware to run in the dynamic environment, thus improving throughput and/or latency response on high-value workloads.

Example embodiments of the present invention are described largely in the context of a fully functional computer system implementing data processing workload control according to embodiments of the present invention. Readers of skill in the art will recognize, however, that the present invention also may be embodied in a computer program product disposed on computer-readable recording media for use with any suitable data processing system. Such recording media may be any recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data processing workload control in a data center, the data center comprising computers whose operations consume power and a workload controller comprising automated computing machinery that controls the overall data processing workload in the data center, the data processing workload comprising a plurality of specific data processing jobs, the method comprising:
scheduling, by the workload controller in dependence upon power performance information, the data processing jobs for execution upon the computers in the data center, the power performance information comprising power consumption at a plurality of power-conserving states for each computer in the data center that executes data processing jobs, wherein the scheduling includes querying a power performance information database to determine:
existence of any average power data for a particular data processing job on any computer in the data center; and
in the history of collecting power performance information, number of computers in the data center having the data processing job scheduled on them; and
dispatching, by the workload controller, the data processing jobs as scheduled for execution on computers in the data center based on the determination.

2. The method of claim 1 further comprising developing the power performance information for each computer in the data center by monitoring actual power history of the computers in the data center.

3. The method of claim 1 wherein:
at least some of the computers in the data center support multiple virtual machines running in logical partitions, and
the power performance information for the computers that support multiple virtual machines running in logical partitions further comprises a power requirement for activation of a virtual machine in a logical partition and power consumption values for incremental power-conserving states for each virtual machine that can be activated on any computer in the data center.

4. The method of claim 1 further comprising:
monitoring available capacity and power-conserving state enablement of the computers in the data center; and
migrating the job to another computer in the data center to continue execution of the job if the target computer provides a better match to the needs of the job than the computer that the job is presently running on.

5. The method of claim 1 further comprising:
monitoring available capacity and power-conserving state enablement of the computers in the data center; and
migrating the job to another computer in the data center to continue execution of the job if the target computer provides an equivalent match to the needs of the job and the result of the move will be that the computer can be moved to a more efficient power-conserving state after the move.

6. The method of claim 1 wherein:
the method further comprises monitoring temperature at a plurality of locations in the data center; and
scheduling further comprises scheduling in dependence upon the temperature at the locations in the data center.

7. The method of claim 1 wherein:
at least some of the data processing jobs are characterized by priorities; and
scheduling further comprises scheduling in dependence upon the priorities.

8. Apparatus for data processing workload control, in a data center, the data center comprising computers whose operations consume power and a workload controller comprising automated computing machinery that controls the overall data processing workload in the data center, the data processing workload comprising a plurality of specific data processing jobs, the apparatus comprising a computer processor, a computer memory operatively coupled to the computer processor, the computer memory having disposed within it computer program instructions which when executed cause the apparatus to function by:
scheduling, by the workload controller in dependence upon power performance information, the data processing jobs for execution upon the computers in the data center, the power performance information comprising power consumption at a plurality of power-conserving operational states for each computer in the data enter that executes data processing jobs, wherein the scheduling includes querying a power performance information database to determine:
existence of any average power data for a particular data processing job on any computer in the data center; and
in the history of collecting power performance information, number of computers in the data center haying the data processing job scheduled on them; and
dispatching, by the workload controller, the data processing jobs as scheduled for execution on computers in the data center based on the determination.

9. The apparatus of claim 8 further comprising computer program instructions which when executed are capable of causing the apparatus to carry out the step of developing the power performance information for each computer in the data center by monitoring actual power history of the computers in the data center.

10. The apparatus of claim 8 wherein:
at least some of the computers in the data center support multiple virtual machines running in logical partitions, and
the power performance information for the computers that support multiple virtual machines running in logical partitions further comprises a power requirement for activation of a virtual machine in a logical partition and power consumption values for incremental power-conserving states for each virtual machine that can be activated on any computer in the data center.

11. The apparatus of claim 8 further comprising computer program instructions which when executed cause the apparatus to function by:
monitoring available capacity and power-conserving state enablement of the computers in the data center; and
migrating the job to another computer in the data center to continue execution of the job if the target computer provides a better match to the needs of the job than the computer that the job is presently running on.

12. The apparatus of claim 8 further comprising computer program instructions which when executed cause the apparatus to function by:
monitoring available capacity and power-conserving state enablement of the computers in the data center; and
migrating the job to another computer in the data center to continue execution of the job if the target computer provides an equivalent match to the needs of the job and the result of the move will be that the computer can be moved to a more efficient power-conserving state after the move.

13. The apparatus of claim 8 wherein:
the apparatus further comprises computer program instructions which when executed cause the apparatus to function by monitoring temperature at a plurality of locations in the data center; and
scheduling further comprises scheduling in dependence upon the temperature at the locations in the data center.

14. The apparatus of claim 8 wherein:
at least some of the data processing jobs are characterized by priorities; and
scheduling further comprises scheduling in dependence upon the priorities.

15. A computer program product for data processing workload control in a data center, the data center comprising computers whose operations consume power and a workload controller comprising automated computing machinery that controls the overall data processing workload in the data center, the data processing workload comprising a plurality of specific data processing jobs, the computer program product disposed in a computer readable medium, wherein the computer readable medium is not a signal, the computer program product comprising computer program instructions which when executed cause automated computing machinery in the data center to function by:
scheduling, by the workload controller in dependence upon power performance information, the data processing jobs for execution upon the computers in the data center, the power performance information comprising power consumption at a plurality of power-conserving states for each computer in the data center that executes data processing jobs, wherein the scheduling includes querying a power performance information database to determine:
existence of any average power data for a particular data processing job on any computer in the data center; and
in the history of collecting power performance information, number of computers in the data center having the data processing job scheduled on them; and
dispatching, by the workload controller, the data processing jobs as scheduled for execution on computers in the data center based on the determination.

16. The computer program product of claim 15 further comprising computer program instructions which cause automated computing machinery in the data center to function by developing the power performance information for each computer in the data center by monitoring actual power history of the computers in the data center.

17. The computer program product of claim 15 wherein:
at least some of the computers in the data center support multiple virtual machines running in logical partitions, and
the power performance information for the computers that support multiple virtual machines running in logical partitions further comprises a power requirement for activation of a virtual machine in a logical partition and power consumption values for incremental power-conserving states for each virtual machine that can be activated on any computer in the data center.

18. The computer program product of claim 15 further comprising computer program instructions which cause automated computing machinery in the data center to function by:
monitoring available capacity and power-conserving state enablement of the computers in the data center; and
migrating the job to another computer in the data center to continue execution of the job if the target computer provides a better match to the needs of the job than the computer that the job is presently running on; or
migrating the job to another computer in the data center to continue execution of the job if the target computer provides an equivalent match to the needs of the job and the result of the move will be that the computer can be moved to a more efficient power-conserving state after the move.

19. The computer program product of claim 15 wherein:
the computer program product further comprises computer program instructions which cause automated computing machinery in the data center to function by monitoring temperature at a plurality of locations in the data center; and
scheduling further comprises scheduling in dependence upon the temperature at the locations in the data center.

20. The computer program product of claim 15 wherein:
at least some of the data processing jobs are characterized by priorities; and
scheduling further comprises scheduling in dependence upon the priorities.

* * * * *